March 7, 1944.  R. DOERR  2,343,647
HOSE NOZZLE
Filed Sept. 22, 1941
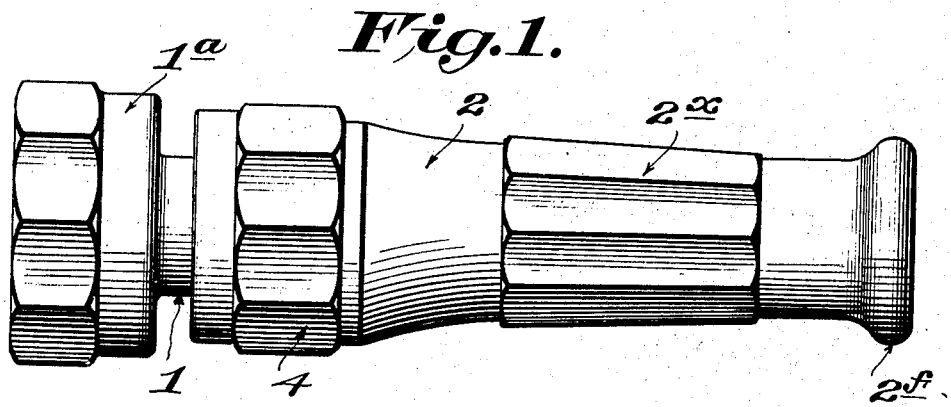
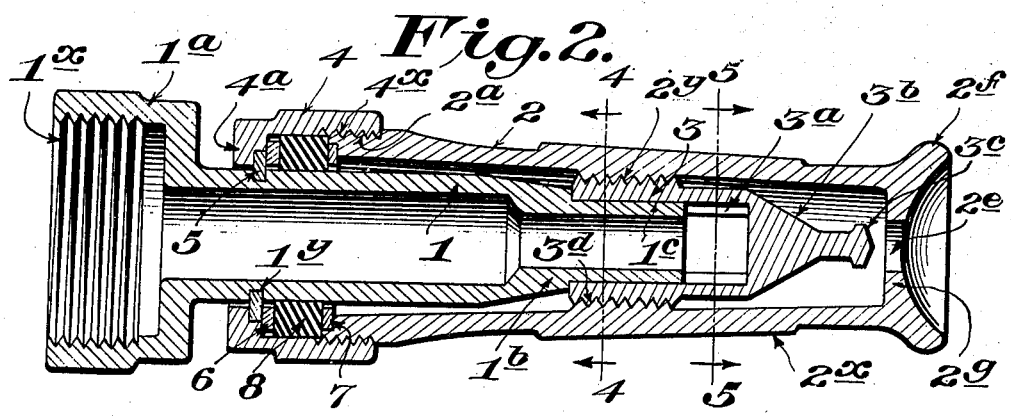
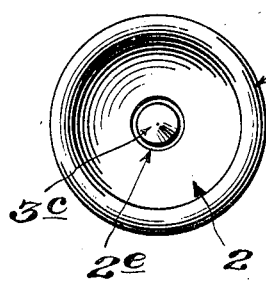
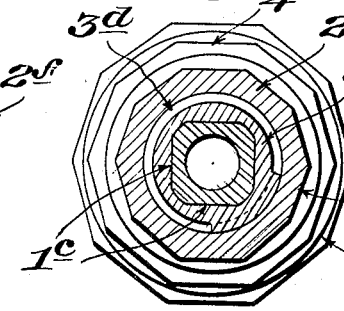
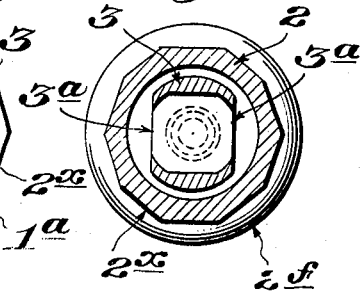
Inventor
Ray Doerr
By Alexander Dowell
Attorneys Patented Mar. 7, 1944

2,343,647

UNITED STATES PATENT OFFICE 2,343,647

HOSE NOZZLE

Ray Doerr, Battle Creek, Mich., assignor to H. B. Sherman Manufacturing Co., Battle Creek, Mich., a corporation of Michigan Application September 22, 1941, Serial No. 411,916

4 Claims. (Cl. 299—131)

This invention is a novel improvement in hose nozzles of the general type shown in U. S. Letters Patents Nos. 742,133 and 856,816.

The accompanying drawing illustrates a nozzle embodying my invention which will be explained with reference thereto; and the claims set forth the essential features of the invention, and novel features of construction, and novel combinations of parts for which protection is desired.

In said drawing:

Fig. 1 is a side elevation of the complete nozzle.

Fig. 2 is an enlarged longitudinal section through the nozzle.

Fig. 3 is an outer end view thereof.

Fig. 4 is a transverse section on the line 4—4, Fig. 2.

Fig. 5 is a transverse section on the line 5—5, Fig. 2.

The nozzle, as shown, comprises a combined all-plastic spindle 1 and a base or hose-end portion 1a, which are preferably molded from cellulose acetate plastic, or from urea formaldehyde, or from other suitable plastic material. Base 1a is internally threaded as at 1x for engagement with the nipple of a hose in the usual manner. The spindle 1 is tubular and cylindric and is adapted to telescope into the sleeve 2, hereinafter described, and is provided adjacent its outer end with a reduced portion 1b, the outer end of which portion is further reduced as at 1c formed into non-circular cross-section, preferably into substantially rectangular shape, as shown in Fig. 4, with beveled edges. The bore through the spindle continues through the outer end of the reduced portions 1b and 1c.

Telescopingly mounted upon the reduced non-circular portion 1c of the spindle 1 is a plastic head 3 preferably molded from the same material as the spindle 1, and having a bore in its inner end slidably fitting portion 1c, said head extending beyond the outer end of the spindle and having opposed openings 3a in its side walls communicating with the spindle bore and permitting liquid from the spindle to pass into sleeve 2. The outer end of head 3 is contracted conically as at 3b and terminates in a valve 3c. The head 3, adjacent its inner end is provided with external threads 3d for engagement with corresponding internal threads in the sleeve 2 whereby rotation of the sleeve will cause axial movement of the head 3 therein.

Rotatably mounted upon the spindle 1 is a plastic sleeve 2 which is preferably molded from the same plastic material as the spindle 1 and head 3, said sleeve 2 being longer than the combined spindle and head. The inner end of sleeve 2 which is nearest the base 1a is of an internal diameter to loosely fit over the spindle 1, and is externally threaded as at 2a for engagement with a nipple 4. Packing nut 4 is of plastic material and is molded preferably from the same material as spindle 1, sleeve 2, and head 3; and has a flange 4a preferably closely fitted to the exterior of the spindle 1.

Packing nut 4 is provided with internal threads 4x engaging the threads 2a of sleeve 2. Nut 4 is maintained in position on the spindle 1 adjacent the base 1a as follows: In the inner face of flange 4a of the nut 4 is an annular recess snugly receiving a split ring or washer 5 mounted in an annular groove 1y in the spindle 1 to prevent outward movement of the nut 4. Adjacent the split ring 5 is a washer 6 within the nut 4 also contacting the split ring 5 and preventing inward movement of the nut 4 on the spindle. A second washer 7 is mounted in an annular recess in the inner end of sleeve 2 and between the washers 6 and 7 is a felt or other annular packing 8 disposed around the spindle 1 within the nut 4 so that when the sleeve 2 is screwed tightly into the nut 4 assembled with the split washer 5 and packing 8, the packing 8 will be compressed between the washers 6 and 7 to make a close water-tight joint between the nut 4, sleeve, and spindle.

Sleeve 2 is internally threaded as at 2y to engage the external threads 3d of the head 3 so that by rotating the sleeve 2 on the spindle, the head 3 will be moved longitudinally or axially of said spindle; and to facilitate rotation of the sleeve 2, the latter is preferably provided with an enlarged non-circular portion 2x on its exterior as shown in Fig. 1. The sleeve 2 has its outer end closed by an integral wall 2g, beyond which extends an outwardly flaring annular flange 2f. In the center of the wall 2g and flange 2f is an axial aperture 2e for the escape of water, which aperture is adapted for the passage therethrough of the valve 3c, whereby the valve 3c can pass through the aperture 2e while the conical portion 3b of the head 3 will close the opening, if sufficiently projected thereinto.

My all-plastic nozzle has the appearance of ordinary metallic nozzles and is of substantially the same size as the aforesaid nozzles. The plastic parts or members are so molded as to secure thickness where strength is essential; and obviates the necessity of using heavy, thick, stampings or castings of metal shaped by lathe operations.

I do not limit my invention to the exact form shown in the drawing for obviously changes may be made therein within the scope of the claims.

I claim:

1. A hose nozzle comprising a combined base and spindle; a head having a bore telescopically receiving the end of the spindle, said head having openings communicating with said bore; the outer end of the head being conically shaped and terminating in a valve; a sleeve around the spindle and head having an outer end wall provided with an aperture cooperating with the valve; a packing nut having a threaded engagement with the inner end of the sleeve, and having an internal annular flange closely fitting the spindle; an annular packing ring within the nut around the spindle interposed between the internal annular flange and adjacent end of the sleeve; means for preventing axial movement of the sleeve on the spindle; means for maintaining the head against rotation; and interengaging threads on the sleeve and head, whereby rotation of the sleeve will move the head axially of the spindle.

2. In a nozzle as set forth in claim 1, a washer closely fitting the spindle and interposed between the inner face of the annular flange and the annular packing ring; and said preventing means consisting of a split ring mounted in an annular groove in the spindle and disposed within an annular recess in the inner face of the annular flange, and contacting the washer and flange.

3. A hose nozzle comprising a base and spindle having a non-circular outer end; a head having a correspondingly shaped non-circular bore telescopically receiving the non-circular end of the spindle, said head having openings communicating with said bore, the outer end of the head being conically shaped and terminating in a valve; a sleeve around the spindle and head having an outer end wall provided with an aperture cooperating with the valve, a packing nut having a threaded engagement with the inner end of the sleeve, and having an internal annular flange closely fitting the spindle; an annular packing ring within the nut around the spindle interposed between the internal annular flange and the adjacent end of the sleeve; means for preventing axial movement of the sleeve on the spindle; and interengaging threads on the sleeve and head, whereby rotation of the sleeve will move the head axially of the spindle.

4. In a nozzle as set forth in claim 3, a washer closely fitting the spindle and interposed between the inner face of the annular flange and the annular packing ring; and said preventing means consisting of a split ring mounted in an annular groove in the spindle and disposed within an annular recess in the inner face of the annular flange, and contacting the washer and flange.

RAY DOERR.